INVENTOR
WILLIAM R. FRINT

April 3, 1962 W. R. FRINT 3,028,215
PREPARATION OF SODIUM CARBONATE
Filed Dec. 2, 1959 2 Sheets-Sheet 2
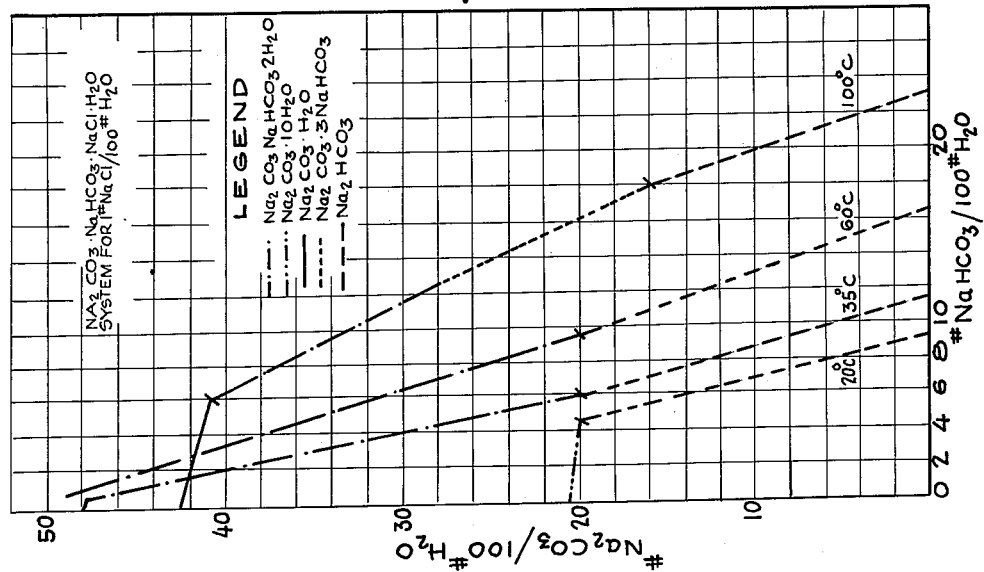
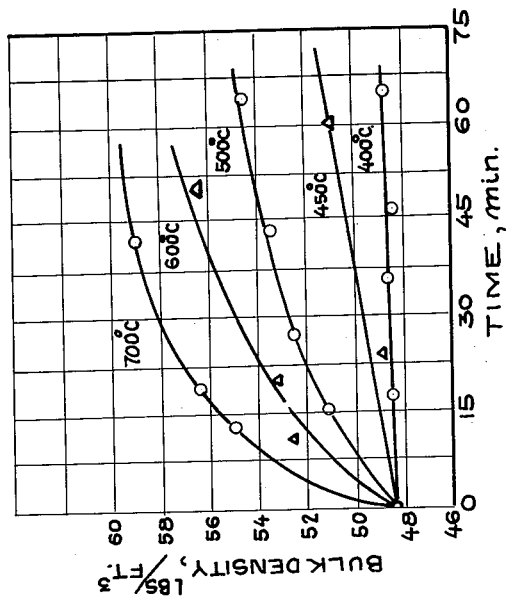
INVENTOR
WILLIAM R. FRINT
BY
*Hammond and Littell*
ATTORNEYS

United States Patent Office 3,028,215
Patented Apr. 3, 1962

3,028,215
PREPARATION OF SODIUM CARBONATE
William Ramon Frint, Green River, Wyo., assignor to
FMC Corporation, a corporation of Delaware
Filed Dec. 2, 1959, Ser. No. 856,842
7 Claims. (Cl. 23—63)

This invention relates to a method of preparing organic-free dense sodium carbonate from crude trona by high temperature calcination of sodium sesquicarbonate, sodium carbonate monohydrate, sodium bicarbonate, or light soda ash as derived from crude trona solutions.

This application is a continuation-in-part of my copending United States patent application Serial No. 601,697, filed August 2, 1956, now abandoned.

It has been the practice in the past to convert crude trona into sodium carbonate by dissolving the crude trona which contains some organic matter in a cycling brine liquor containing a greater concentration of normal sodium carbonate than bicarbonate and maintained in such balance that sodium sesquicarbonate is crystallized from the solution on evaporation and/or cooling. The pregnant brine solution then passes to a clarifier and thickener where the insoluble material in the crude trona is substantially all removed and the overflow liquid is passed into a vessel into which sufficient activated carbon to remove organic matter contained in the overflow liquor is added.

After contacting the liquor with activated carbon the liquor is carefully passed through filters in order to remove the activated carbon and absorbed organic matter. The filtrate is then passed to a set of crystallizers where sodium sesquicarbonate is crystallized out and is recovered by filtration or centrifuging from the cycling brine liquor. The recovered sodium sesquicarbonate is then calcined at the relatively low temperature of about 200 to 300° C. to produce light soda ash. This process is described in greater detail in United States Patent No. 2,639,217, granted May 19, 1953. In order to produce dense soda ash, the light ash is reacted with sufficient water to form sodium carbonate monohydrate which is then calcined to drive off the water of hydration and to yield dense ash.

Crude trona (as found in the Green River area of Wyoming) has the following representative analysis:

| | Percent |
|---|---|
| Sodium sesquicarbonate | 92.76 |
| Sodium chloride | .08 |
| Sodium sulfate | .02 |
| $Fe_2O_3$ | 0.16 to 0.26 |
| Organic matter | 0.30 |
| Insolubles | About 6.5 |

The organic matter present in crude trona to the extent of about 0.30% causes the trona solution, and consequently, any sodium products obtained therefrom, to have a brownish cast. The organic matter consists of monocarboxylic acids, dicarboxylic acids, certain unsaturated acids, three or four classes of steroids, certain rosin acids, etc.

In addition to the normal impurities in the crude trona which is dissolved in the recycling mother liquor, an alkylated benzene sulfonate crystallization modifier, an organic defoaming agent and sodium sulfide are added to the recycling mother liquor and the recycling mother liquor picks up certain impurities in its circulation through the plant. All these soluble organic impurities are in the trona solution at the point of crystallization.

As noted above, the prior art method of producing organic-free sodium carbonate from crude trona requires that the recycling liquors be contacted with an adsorbent such as carbon. The use of an adsorbent to remove organic matter in the trona process liquors requires special equipment to separate the activated carbon and adsorbed organics from the trona solution and requires the use of substantial amounts of activated carbon and is therefore an expensive step in the production of soda ash from trona.

The densification of light soda ash by this method requires the preliminary formation of light ash by calcination of sodium sesquicarbonate, the formation of the monohydrate of sodium carbonate from the light ash by hydration and then, the step of calcining said monohydrate to yield a dense soda ash. Each of these operations is time consuming and requires a high equipment cost.

In addition to crystallizing sodium sesquicarbonate from the recycling mother liquor, as described above, it is also possible by adjusting the temperature and ratio of sodium carbonate to sodium bicarbonate to precipitate other crystals, such as sodium carbonate monohydrate, sodium carbonate decahydrate, sodium bicarbonate and the mixed salt $Na_2CO_3 \cdot 3NaHCO_3$. The ratio of sodium carbonate to sodium bicarbonate in the pregnant mother liquor is controlled by the amount of loss of $CO_2$ from the liquor which occurs between the dissolvers and the crystallizers and the amount of bleed of the recycling mother liquor.

In the instance where sodium carbonate monohydrate is crystallized from crude trona solutions, the preliminary steps of forming light ash by low temperature calcination and then hydrating to form sodium carbonate monohydrate are obviously not necessary, but nonetheless, the advantage of removing organic impurities by the high temperature calcination described herein is equally applicable to the preparation of sodium carbonate through the calcination of sodium carbonate monohydrate. In all other instances of processing carbonate crystals, it has been necessary to rehydrate the light soda ash produced and recalcine in order to obtain a dense soda ash.

One of the objects of the present invention is to provide an organic-free soda ash from crude trona without the expense of activated carbon treatment to remove organic matter from the trona solutions.

Another object of the invention is to simplify and reduce the cost of soda ash production from crude trona.

Another object of the invention is to provide soda ash of controlled density by the use of only one calcination step.

Various other objects and advantages of the invention will appear as this description proceeds.

While it is preferred to produce the crude trona solutions by dissolving ground trona in a recycling mother liquor at the ground surface as described in greater detail in the preferred embodiment hereinafter used to best illustrate the process, the crude trona solutions may be prepared by dissolving in other ways such as trona in water, either at the surface of the ground by circulation of water or mother liquor through the underground trona formation, as by circulating the solution between spaced interconnected wells extending into the trona formation or through abandoned dry mining tunnels as described in United States Patent No. 2,625,384. Such solutions of crude trona may also be concentrated to produce crystals therefrom in other manners than hereinafter specifically described such as by spray drying, solar evaporation and the like, and the impure crystals so produced may then be calcined to produce organic free dense soda ash by the process of this application. When trona solutions are produced by underground solution mining methods the organic content of the solution is usually higher than when the trona is dry mined and dissolved in a solution liquor above ground, because when a solution liquor is contacted with the trona formation underground, it not only dissolves some of the organics in the trona itself, but also dissolves some organics from the shale and other materials in the surrounding formation.

Generally stated, this invention involves the high temperature calcination of the solid carbonate products of crude trona solutions containing organic matter no matter how said solutions are formed to produce an organic-free sodium carbonate of increased density therefrom.

More specifically stated, this invention involves the calcination of the crystallization products of crude trona solutions containing organic impurities in a non-reactive atmosphere at temperatures between about 400° C. to about 800° C. for a period of time sufficient to convert the crystallization products obtained from a crude trona solution to soda ash, whereby substantial amounts of the organic impurities are volatilized from the soda ash and the remainder of the organic impurities are converted to a coke and the ash is densified to the desired degree. The soda ash so produced has a high bulk density and when heated with phosphoric acid produces a sodium tripolyphosphate with a reflectance above 85 and gives a low foam index when mixed with phosphoric acid.

This invention results from the discovery that soda ash, relatively free of organic impurities, can be produced from crystals containing organic impurities by the process hereinafter described.

Except in the case where sodium carbonate monohydrate is the crystallization product of the crude trona solution, the invention has the further advantage that the bulk density of sodium carbonate or soda ash may be controlled and increased by the high temperature calcination, whether said sodium carbonate is formed by the calcination of sodium sesquicarbonate, sodium bicarbonate, light soda ash (sodium carbonate), or other forms of sodium carbonate crystals without going through the step of forming sodium carbonate monohydrate from previously calcined light soda ash, as is the present practice.

While the process of producing a dense soda ash herein described may be used with purified, organic-free sodium sesquicarbonate, sodium bicarbonate or light soda ash crystals, a particular advantage of the process resides in the fact that impure products of crystallization containing the normal organic impurities contained in the original solution may be removed in the same high temperature calcination step used to densify the dense soda ash. Because of this advantage, elaborate precautions heretofore considered necessary to remove organic material from the trona solution before crystallization of sodium sesquicarbonate therefrom, may be dispensed with, together with the cost of activated carbon treatment and expensive filtration steps and a pure dense soda ash may be produced directly from sodium sesquicarbonate, or other forms of sodium carbonate crystals light soda ash containing organic and other impurities.

FIGURE 2 is a graph of the effect of temperature and time of calcining on the bunk density of soda ash; and FIGURE 3 is a graph of the $Na_2CO_3 \cdot NaHCO_3 \cdot H_2O$ crystallization system showing various sodium carbonate crystals which may be produced therefrom.

Figure 1:
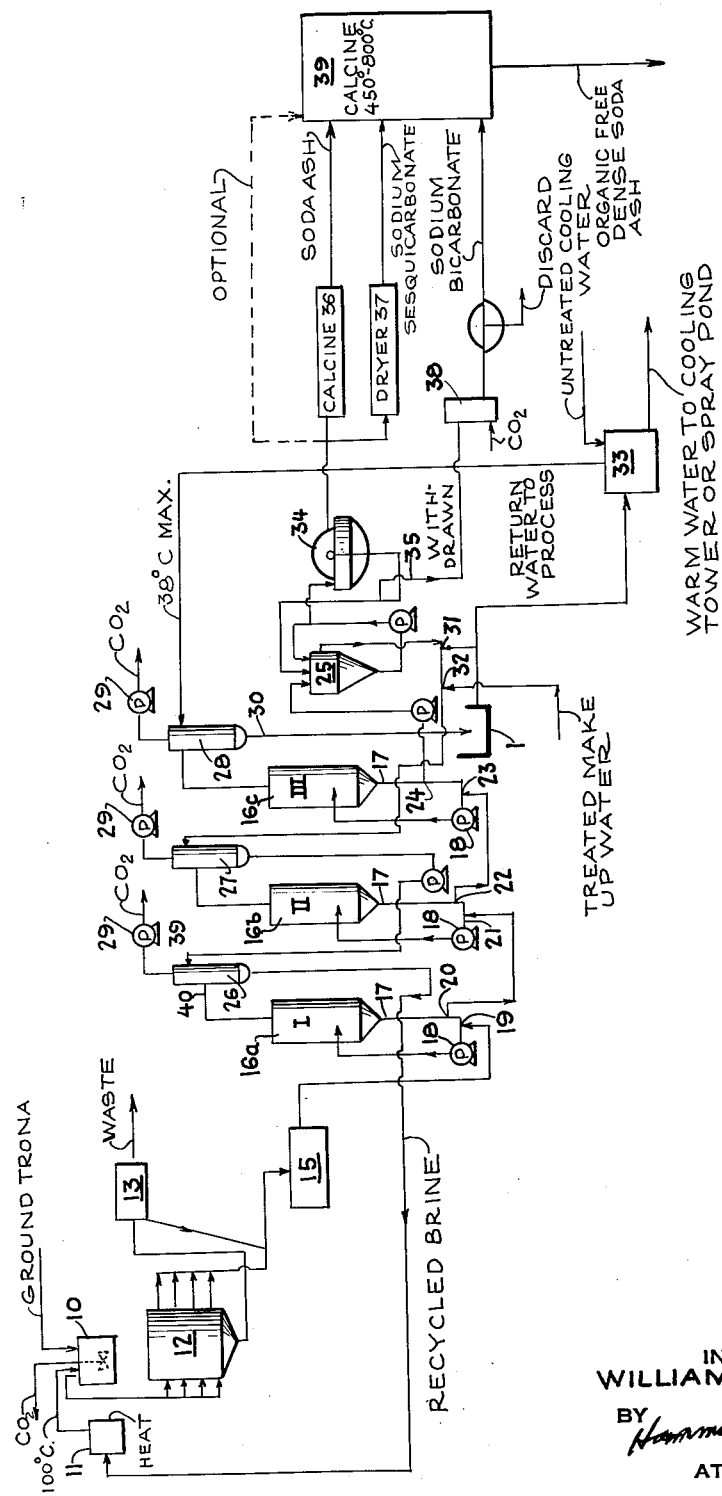
FIGURE 1 represents a flow diagram of one form of cyclic process of producing organic free dense soda ash.

In the embodiment illustrated in FIGURE 1, an agitating vessel 10 is used for dissolving ground trona in recycled brine or mother liquor which has been heated to about 100° C. in heater 11. Preferably, the trona which has been removed from the trona formation by dry mining methods is ground so that all will pass a 20 mesh screen. Two or three dissolving vessels may be used in series so as to make a substantially saturated solution, or this may be done by dissolving in batches in a well known manner, as may be preferred. The saturated solution then goes to a settler 12, which is preferably a four-tray parallel feed thickener, insulated heavily against the loss of heat. The thickened underflow of this thickener passes to a centrifuge or filter 13, or other well known suitable dewatering device, in which shale and other insoluble material found in natural trona is removed. The brine removed in 13 joins the clarified overflow from 12 and the insoluble residue is discarded to waste. All or a part of the makeup water referred to later may be employed to wash the insoluble material in 13 free of brine, and this wash water containing some trona values may be returned to the main stream of makeup water added to the recycle mother liquor.

The combined streams of brine from 12 and 13 go to a surge tank 15. At this point a crystallization modifier such as an alkyl benzene sulfonate, an organic defoamer and an iron solubility depressant such as sodium sulfide may be added.

The hot saturated brine containing soluble organic impurities now enters the first effect of a series of vacuum crystallizers diagrammatically illustrated at 16a, b and c where the temperature is reduced to about 45° C. to effect crystallization. The number of crystallizer effects is dictated by considerations of economy and the process may be carried out, if desired, with the use of a single effect or with more than three effects.

In the crystallizers 16a, 16b and 16c a separate recirculation of brine is preferably maintained through each effect by withdrawing a slurry of brine and crystals through a barometric leg 17 from the bottom of each effect, and pumping it back by pumps 18 into the main bodies of the effects. The circulating brine from 15 enters the recirculation of the first effect at 19 and leaves at 20, entering the recirculation of the second effect at 21 and leaving 22, entering the recirculation of the third effect at 23 and leaving at 24, whence it is pumped into crystal settler 25. In the crystallizer system the temperature of the trona solution is reduced to about 45° C. to cause crystallization.

It is to be understood, however, that different sets of operating conditions may be chosen and maintained and that a greater or lesser number of crystallizer effects may be used and a greater or lesser temperature drop produced. Crystalizers 16a, 16b and 16c are provided with condensers 26, 27 and 28 respectively and each condenser is provided with a top connection to a vacuum pump 29 for removing unabsorbed $CO_2$, and any other non-condensable gases, and each is provided with a barometric leg 30. Condenser 28, which is connected to the third, or last, effect of the series of crystallizers, is preferably supplied with a spray of water at a maximum temperature of about 38° C. The water which is evaporated in this effect under the influence of the vacuum, is condensed and returned to the circulation at 31 at a temperature of about 52° C. Cold pure makeup water, some of which may have been used as a wash in 13, is introduced at 32. The water is introduced in the region of 31 and 32 because this immediately removes the saturation of the recirculating brine and cools the brine to some extent, and from the point in its flow until it again reaches vessel 10, it is unsaturated and cannot, therefore, deposit crystals in the pipe lines. The balance of the water introduced into the condenser 28, amounting to about 950 g.p.m. is cooled in tubular cooler 33, on the outside of the piping of which flows cold untreated water from a spray pond, or tower, not shown. In this way the treated water which is evaporated in the third effect is saved and returned to the system, whereas if the condenser 28 had been provided with untreated water, the pure water would have been contaminated by untreated water.

The net circulation from the third effect 16c is withdrawn at 24 and pumped to settler 25. The underflow from 25 is a thickened slurry of crystals of sodium sesquicarbonate or any other sodium carbonate salt which may be crystallized from the trona solution dependent upon the composition. The crystals are dewatered in a centrifuge or filter 34. The filtrate from 34 is returned to the crystal settler 25 and a portion or all of this filtrate may be withdrawn at 35 and carbonated in a carbonating tower 38 to produce sodium bicarbonate crystals.

The crystals recovered in centrifuge 34 which are preferably organic containing sodium sesquicarbonate ($Na_2CO_3 \cdot NaHCO_3 \cdot 2H_2O$) may be calcined in any suitable device 36, to make light soda ash or many be dried in drier 37 to produce crystals of sodium sesquicarbonate or the wet crystals from the centrifuge 34 may be passed directly to a high temperature calciner 39 to be calcined directly into organic free dense soda ash as hereinafter described.

The crystals produced by any of these alternatives may be passed to calciner 39, such as a rotary gas fired calciner where they are calcined in a non-reactive atmosphere at temperatures between 450° C. and 800° C. for a time sufficient to volatilize substantial amounts of organic impurities therefrom and to convert the remainder of the organic impurities to a coke and to densify the ash, giving an organic-free dense soda ash which gives a low foam index when mixed with phosphoric acid and which when heated with phosphoric acid produces a sodium tripolyphosphate having a reflectance above about 85.

The overflow from the settler 25 is at a temperature of about 45° C. This temperature is lowered and the brine is somewhat diluted by the addition of makeup and recovered water at 31 and 32, as disclosed above. This brine is then used as the condensing spray in barometric condenser 27 which serves the second effect. This somewhat further dilutes and heats the brine which is then used as the condensing spray in 26. The brine leaving 26 through the barometric leg 30 may be heated as high as about 74° C., and is the recycled mother liquor which goes to heater 11 preparatory for reuse for dissolving trona in 10.

In addition to the embodiment described above crystalline products can be recovered from crude trona by dissolving the crude trona in water, either at the surface of the ground or below the surface in trona formations interconnected with wells or tunnels. The crude trona solution is clarified, as above and thereafter the clarified solution may be spray-dried or allowed to evaporate in outdoor ponds to give crystalline products which are calcined in a calciner 39 as indicated above. Here, also, organic-free dense soda ash is produced.

As one example of the practice of our invention as shown in FIGURE I: crude trona is dissolved at 10 in a recycling mother liquor containing substantially more normal carbonate than bicarbonate, the solution of crude trona is clarified in a normal type Dorr or other clarifier or thickener 12 and the clarified solution is fed to a series of crystallizers 16a, b and c where crystallization of sodium sesquicarbonate is effected by cooling and/or evaporation. At this point, the precipitated sodium sesquicarbonate crystals will contain organic impurities. The impure sodium sesquicarbonate may be either calcined at high temperatures in calciner 39 to yield an organic-free dense ash or the sesquicarbonate may be first calcined at a temperature between 200 and 300° C. in calciner 36, to yield an impure light ash, and then subsequently calcined at higher temperatures of 450 to 800° C. in calciner 39, to yield an organic-free dense ash.

The high temperature calcination may be effected by any conventional calcining means, such as a rotating drum calcining kiln or a stationary or fluidized bed operation.

As stated above the temperature necessary to bring about an increase in density is interrelated with the time the material is in the calcining zone. In FIGURE 2, this correlation of temperature and time and its effect on the increase or bulk density in the calcining of light soda ash is shown.

While the crystallization products of crude trona solutions containing organic impurities may be calcined at a temperature as low as 400° C. to yield an organic-free dense soda ash, it is preferable to perform the high temperature calcination at a temperature of about 450–550° C. Time and economy considerations make this the preferred temperature range.

As shown in FIGURE 2 in calcining a light soda ash, having an initial bulk density of 48 lbs. per cubic foot at a calcining temperature of 400° C., no material increase in bulk density is brought about even after calcining for 60 minutes. However, when the calcining temperature is between 500° C. and 600° C. an increase in bulk density from 48 lbs. per cu. ft. to approximately 52 lbs. per cu. ft. is brought about in 15 minutes, and in 30 minutes at about 550° C. the bulk density of said light soda ash may be increased from 48 lbs. per cu. ft. to 54 lbs. per cu. ft. At higher calcining temperatures a more rapid increase in bulk density may be brought about in a short calcining time. However, the increased heat cost makes the temperature range of 500 to 600° C. more economical, with the preferred temperature being about 550° C.

The other effect on the soda ash brought about by high temperature calcination, that is, the removal of organic impurities is shown by the foaming of the soda ash and phosphate color characteristics of the sodium tripolyphosphate produced therefrom as hereinafter described. A low foaming and high reflectance is indicative of organic-free sodium carbonate.

The foam test consists in measuring the foam height produced in a cylinder when soda ash and phosphoric acid are stirred together.

The apparatus used in the foam test consists of a 6.0 cm. bore Pyrex tube, 61 cm. long. A number 12 rubber stopper is cut laterally so that the bottom diameter is 6.3 cm. and the thickness is 1.2 cm. A hole is cut in the center of the stopper and a stirring mechanism fitted therein. The stirring shafts has a four-blade stirrer connected thereto.

A three-way (T) stopcock serves as the column drain and to admit the acid to the column from a 250 ml. burette. Mounted slightly above the four-blade stirrer is a baffle which is constructed by criss-crossing two 16 gauge stainless plates (1.3 x 5.9 cm.) and welding on 4 legs (16 gauge 0.35 x 4.6 cm.) at the outside of the plates. A meter stick is mounted adjacent the outside of the colmn so as to read the foam height.

The foam height of a given sample is dependent upon the rate of acid addition. Greater foam heights are obtained by increasing the acid rate. The optimum acid rate is found to be 20 ml. per minute. Higher rates cause erratic bouncing of the foam.

It has also been found advantageous in determining the foam height to add about 1 p.p.m. of an alkyl benzene sulfonate to the material in the cylinder. This likewise helps to control the sudden surging of the foam height.

Ninety-five grams of the soda ash to be tested is added to 150 mls. of hot distilled water (65° C.). One p.p.m. of the alkyl benzene sulfonate is added to the distilled water. The soda ash and distilled water are then added to the cylinder and then 80 mls. of 75% phosphoric acid solution are added over a four minute period.

The second column of Table I shows the effect of high temperature calcination on foaming characteristics of a sample of light soda ash.

Reflectance is a measure of the whiteness of sodium tripolyphosphate prepared by the interaction of the proper ratios of sodium carbonate and phosphoric acid and fusing the mixture so prepared, and is measured by a standard means of determining light reflectance. The test employed for the reflectance determinations found in Table I consisted of grinding 20 to 30 grams of sodium tripolyphosphate, produced from the sodium carbonate to be tested in a mortar with a pestle for at least 5 minutes. After the tripolyphosphate has been ground for the stated time it was transferred to a plate glass square. Another plate glass square was placed on top of the sample and the top plate glass was pressed down with the full weight of the body to form a hard smooth surface.

The reflection meter used to measure the whiteness of the samples is standardized by adjusting the sensitivity knobs so that the galvanometer reads 0% on an enamel standard and 100% on a freshly scratched magnesium carbonate block.

The glass plate is carefully removed from the top of the sample to be measured and the search unit of the reflectance meter placed on the smooth surface of the sample so as not to disturb the surface. The reflectance is then measured to the nearest percent.

Table I set forth below shows various test comparisons on the effect of calcination of light soda ash at various temperatures for 13 minutes.

*Table I*

| Temperatures, ° C. | Foam Height, cm. | Percent Reflectance of Sodium Tripolyphosphate Produced From the Soda Ash |
|---|---|---|
| Original Sample—250° C. | 40 | 58 |
| 500 | 8 | 94 |
| 550 | 8 | 94 |
| 505 | 9 | 85 |
| 650 | 8 | 90 |
| 700 | 8 | 90 |

Thus, when impure light soda ash crystallized from a recycling mother liquor and containing the normal organic impurities found in crude trona solutions is tested for foaming characteristics, it shows a high foam due to the organic impurities therein. After high temperature calcination, the foaming under identical test conditions is materially reduced. Also the light reflectance of sodium tripolyphosphate produced from light soda ash calcined at low temperatures of between 200 and 300° C. and containing organic impurities is low, whereas when said impurities are either volatilized from the soda ash or converted to a coke by a short period of high temperature calcination the light reflectance of the sodium tripolyphosphate produced therefrom is materially increased.

An analysis of the above Table I clearly shows the effect that high temperature calcination has in removal of organic impurities as illustrated by the decrease in foam and increase in total whiteness.

The following experimental runs were made to determine the effect of different atmospheres on the bulk density and organic contaminant content of soda ash produced by calcining soda products derived from crude trona at high temperatures.

All runs, except the last two which were made in a Standard Steel pilot rotary calciner, were made in a fluidized bed reactor into the top of which was fed a soda product derived from trona and into the bottom of which was fed a hot gas. The temperature of the fluidized bed was determined by a thermocouple inserted therein. The organic material is reported as C.O.D. p.p.m. $O_2$, chemical oxygen demand in parts per million of oxygen. This is determined in a known manner by oxidizing the organics. Since the starting materials varied both in composition and amount of organic material contained depending upon their manner of production, and the runs were at various temperatures, the reduction in organic material is correlated by a determination of what percent the final C.O.D. figure is of the initial C.O.D. figure.

The various atmospheres were produced by passing gases into the calciner. The gases utilized were air, nitrogen, steam and flue gas (by burning natural gas in an excess of air). The soda products calcined were light soda ash, bulk density 50 pounds per cubic foot or less, sodium carbonate monohydrate and sodium sesquicarbonate. The light ash and the sodium carbonate monohydrate were both obtained from sodium sesquicarbonate crystallized from a crude trona solution. The light soda ash was derived by calcining the sodium sesquicarbonate crystals at a low temperature and the monohydrate was derived by hydrating the light ash so produced.

Table II, following, is a tabulation of the various experimental runs.

*Table II*

| Run No. | Fluidizing Gas | Bed Temp., ° C. | Final C.O.D., p.p.m. $O_2$ | Final C.O.D., percent Orig. C.O.D. | Bulk Dens., lb./cu. ft. |
|---|---|---|---|---|---|
| Untreated light ash. | | | 362 | | 50.0 |
| 33 | Air | 341 | 237 | 65.4 | 50.7 |
| 31 | Nitrogen | 333 | 305 | 84.2 | 51.0 |
| 27 | Air | 514 | 122 | 33.7 | 55.3 |
| 32 | Nitrogen | 510 | 132 | 36.4 | 55.2 |
| Untreated light ash. | | | 317 | | 49.7 |
| 42 | Air | 346 | 274 | 86.4 | |
| 44 | Nitrogen | 344 | 286 | 90.2 | 51.7 |
| 39 | Air | 414 | 148 | 46.7 | 52.2 |
| 45 | Nitrogen | 403 | 207 | 65.3 | 52.0 |
| 46 | do | 451 | 153 | 48.3 | 51.8 |
| 47 | do | 512 | 128 | 40.4 | 52.1 |
| Untreated Monohydrate. | | | 667 | | |
| M-7 | Air | 416 | 181 | 27.1 | |
| M-8 | Nitrogen | 433 | 174 | 26.1 | |
| Untreated Monohydrate. | | | 851 | | |
| S-13 | Steam | 459 | 147 | 17.3 | |
| Untreated Light ash. | | | 317 | | 49.7 |
| S-9 | Steam | 412 | 113 | 35.6 | 51.7 |
| S-11 | do | 450 | 40 | 12.6 | 52.8 |
| S-8 | do | 475 | 65 | 20.6 | 52.9 |
| S-10 | do | 510 | 56 | 17.7 | 53.0 |
| Untreated Sesqui (S.A. Basis). | | | 811 | | |
| 10S.S. | Flue gas | 466 | 3 | 0.3 | 45 |
| 6S.S. | do | 246 | 502 | 61.9 | 41 |

All data are from pilot fluidized bed operation except 10SS and 6SS which were made using a pilot rotary calciner.

These results demonstrate that the densification and the amount of organics removed by calcining soda ash at temperatures above 400 C. is about the same, regardless of the atmosphere. The atmosphere to all intents can be any which is inert or non-reactive to the reactants. By a non-reactive atmosphere, I mean any gaseous atmosphere which will transfer heat to the particles being calcined and carry off volatile products without reacting with the the sodium carbonate products or the volatile impurities. While I do not wish to be bound to any particular theory of reaction mechanism of why the organics are removed on high temperature calcination, it is obvious that oxidation of the organics does not account for their removal from the soda ash. Table II demonstrates that the removal of organics from soda ash is a reaction having the characteristics of dependence on mass transfer. The organics are volatilized to a large extent and the remainder undergo a coking process rather than an oxidative process.

The residual organics remaining on the soda ash particles after calcining above 400° C. are primarily in the form of a coke deposit having an estimated carbon to hydrogen ratio of 12 to 15 to 1. This coke residue is not soluble and therefore does not give the customary "organic" problem when the soda ash is utilized in commerce. The coke residue does not cause foaming when the soda ash is dissolved in phosphoric acid and the reflectance of sodium tripolyphosphate produced from the high temperature calcined soda ash is greatly improved as is demonstrated by Table 1.

As illustrated by the solution diagram of FIG. 3 for the system, $Na_2CO_3$—$NaHCO_3$—$NaCl$—$H_2O$ containing 1 pound of NaCl per 100 pounds of water, in addition to crystallizing sodium sesquicarbonate from the recycling mother liquor, as described above, it is also possible by adjusting the temperature and ratio of sodium carbonate to sodium bicarbonate to precipitate other crystals, such as sodium carbonate monohydrate, sodium carbonate decahydrate, sodium bicarbonate and the mixed salt $$Na_2CO_3 \cdot 3NaHCO_3$$

Pursuant to the requirement of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure, otherwise than as specifically described and exemplified herein.

That which is claimed as patentably novel is:

1. The method of producing sodium carbonate from naturally occurring crude trona containing organic impurities which comprises dissolving said crude trona in a liquor from which the dissolved trona may be crystallized, clarifying said solution, while leaving organic impurities dissolved therein, crystallizing and recovering sodium carbonate-containing crystals from said solution, said crystals containing organic impurities, calcining said crystals in a non-reactive atmosphere at a temperature between 400° C. and 800° C. for a time sufficient (a) to volatilize substantial amounts of organic impurities therefrom, (b) to convert most of the remainder of the organic impurities to a coke, and (c) to convert said sodium carbonate-containing crystals into soda ash, said soda ash, so produced, having a high bulk density and, when heated with phosphoric acid, producing a sodium tripolyphosphate with a reflectance above about 85 and said soda ash giving a low foam index when mixed with phosphoric acid.

2. The method of producing sodium carbonate from naturally occurring crude trona containing organic impurities which comprises dissolving said crude trona in a cycling mother liquor of sodium carbonate and sodium bicarbonate containing substantially more normal carbonate than bicarbonate and which is unsaturated with respect to trona and from which the dissolved trona may be crystallized as sodium sesquicarbonate, clarifying said solution, while leaving organic impurities dissolved therein, crystallizing and recovering sodium sesquicarbonate crystals from said solution, said crystals containing organic impurities, calcining said crystals in a non-reactive atmosphere at a temperature between 400° C. and 800° C. for a time sufficient (a) to volatilize substantial amounts of organic impurities therefrom, (b) to convert most of the remainder of the organic impurities to a coke, and (c) to convert said sodium sesquicarbonate crystals into soda ash, said soda ash, so produced, having a high bulk density and, when heated with phosphoric acid, producing a sodium tripolyphosphate with a reflectance above about 85 and said soda ash giving a low foam index when mixed with phosphoric acid.

3. The method of reducing organic material and increasing the density of sodium carbonate produced from solutions of crude trona containing organic impurities which comprises crystallizing from said crude trona solution a compound selected from the group consisting of sodium sesquicarbonate, sodium bicarbonate and sodium carbonate monohydrate, said crystals containing organic impurities, and calcining said crystals in a non-reactive atmosphere at a temperature between 400° C. and 800° C. for a time sufficient (a) to volatilize substantial amounts of organic impurities therefrom, (b) to convert most of the remainder of the organic impurities to a coke, and (c) to convert said sodium carbonate-containing crystals into soda ash, said soda ash, so produced, having a high bulk density and, when heated with phosphoric acid, producing a sodium tripolyphosphate with a reflectance above about 85 and said soda ash giving a low foam index when mixed with phosphoric acid.

4. The method of reducing organic material and increasing the density of sodium carbonate produced from solutions of crude trona containing organic impurities which comprises crystallizing and producing from said crude trona solution a sodium carbonate-containing compound selected from the group consisting of sodium sesquicarbonate, sodium bicarbonate, sodium carbonate monohydrate and light soda ash, said compound containing organic impurities and calcining said compound in non-reactive atmosphere at a temperature between 400° C. and 800° C. for a period of at least 10 minutes (a) to volatilize substantial amounts of organic impurities therefrom (b) to convert most of the remainder of the organic impurities to a coke, and (c) to convert said sodium carbonate-containing crystals into soda ash, said soda ash having a high bulk density and, when heated with phosphoric acid, producing a sodium tripolyphosphate with a reflectance above about 85 and said soda ash giving a low foam index when mixed with phosphoric acid.

5. The method of producing sodium carbonate from crude trona solutions containing organic impurities which comprises crystallizing sodium sesquicarbonate from said crude trona solution, said crystals containing organic impurities, and calcining said crystals in a non-reactive atmosphere at a temperature between 400° C. and 800° C. for a time sufficient (a) to volatilize substantial amounts of organic impurities therefrom (b) to convert most of the remainder of the organic impurities to a coke, and (c) to convert said sodium sesquicarbonate-crystals into soda ash, said soda ash having a high bulk density and, when heated with phosphoric acid, producing a sodium tripolyphosphate with a reflectance above about 85 and said soda ash giving a low foam index when mixed with phosphoric acid.

6. The method of producing sodium carbonate from crude trona solutions containing organic impurities which comprises crystallizing sodium sesquicarbonate from said crude trona solution, said crystals containing organic impurities, and calcining the crystals in a non-reactive atmosphere at a temperature between 400° C. and 800° C. for a period of at least 10 minutes (a) to volatilize substantial amounts of organic impurities therefrom, (b) to convert most of the remainder of the organic impurities to a coke, and (c) to convert said sodium sesquicarbonate crystals into soda ash, said soda ash having a high bulk density and when heated with phosphoric acid, producing a sodium tripolyphosphate with a reflectance above about 85 and said soda ash giving a low foam index when mixed with phosphoric acid.

7. The method of producing sodium carbonate which comprises: dissolving the crude trona containing organic impurities in an aqueous solvent, clarifying the solution so formed, leaving organic impurities dissolved therein, recovering sodium carbonate-containing crystals containing organic impurities from said clarified solution, calcining said crystals at normal calcining temperatures to form a light ash containing organic impurities therein, calcining said light ash in a non-reactive atmosphere at a high temperature between 450° C. and 550° C. for a period of from 10 minutes to 60 minutes (a) to volatilize substantial amounts of organic impurities therefrom, (b) to convert most of the remainder of the organic impurities to a coke, and (c) to convert said sodium carbonate-containing crystals into soda ash, said soda ash having a high bulk density and, when heated with phosphoric acid, producing a sodium tripolyphosphate with a reflectance above about 85 and said soda ash giving a low foam index when mixed with phosphoric acid.

References Cited in the file of this patent

UNITED STATES PATENTS

| | | |
|---|---|---|
| 2,704,239 | Pike | Mar. 15, 1955 |
| 2,770,524 | Seaton | Nov. 13, 1956 |
| 2,780,520 | Pike | Feb. 5, 1957 |

UNITED STATES PATENT OFFICE
CERTIFICATE OF CORRECTION

Patent No. 3,028,215             April 3, 1962

William Ramon Frint

It is hereby certified that error appears in the above numbered patent requiring correction and that the said Letters Patent should read as corrected below.

Column 3, line 55, for "bunk" read -- bulk --; column 5, line 2, for "many" read -- may --; column 6, line 37, after "stainless" insert -- steel --; line 38, after "outside" insert -- edge --; line 40, for "colmn" read -- column --.

Signed and sealed this 7th day of August 1962.

(SEAL)
Attest:

ERNEST W. SWIDER
Attesting Officer

DAVID L. LADD
Commissioner of Patents